Figure 1:
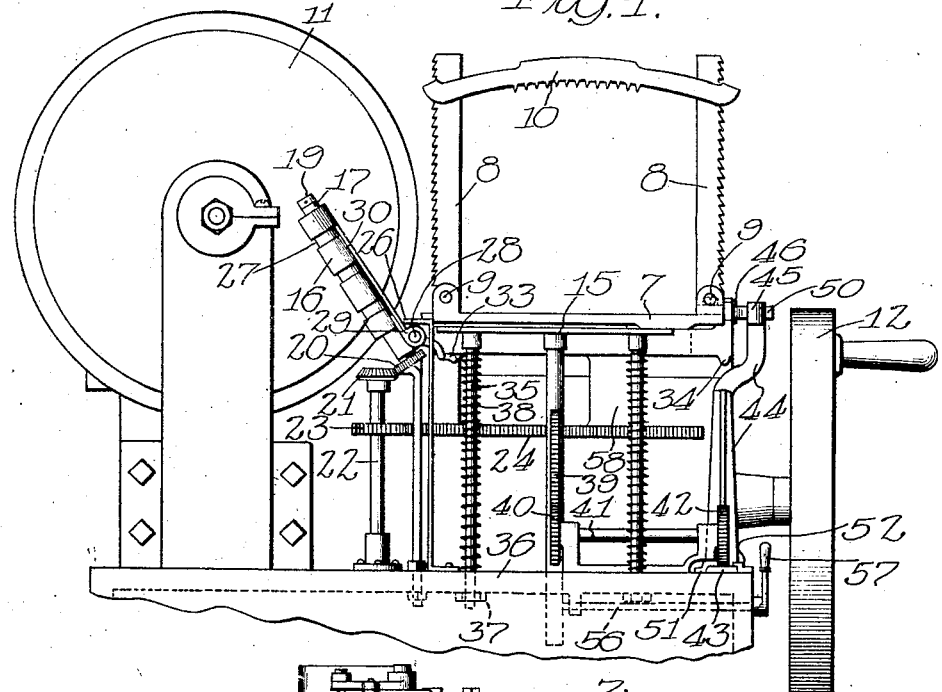

E. M. STILES.
MEAT STACKER.
APPLICATION FILED FEB. 19, 1912.

1,043,878.

Patented Nov. 12, 1912.

2 SHEETS—SHEET 1.

Witnesses:
H. Thomarus Jr.
P. Burkhardt

Inventor
Edward M. Stiles
By Warwur Hopkins
Attys

E. M. STILES.
MEAT STACKER.
APPLICATION FILED FEB. 19, 1912.
1,043,878.
Patented Nov. 12, 1912.
2 SHEETS—SHEET 2.
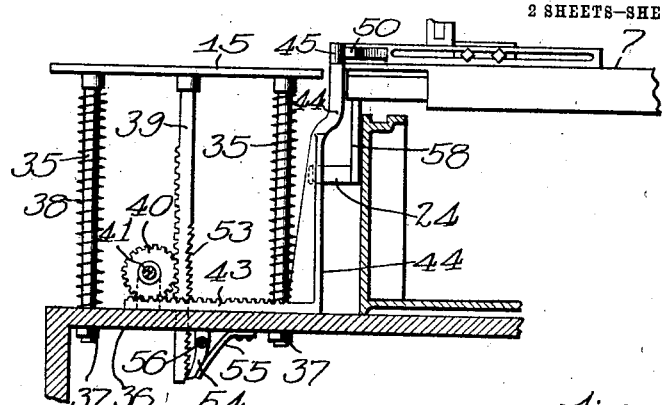
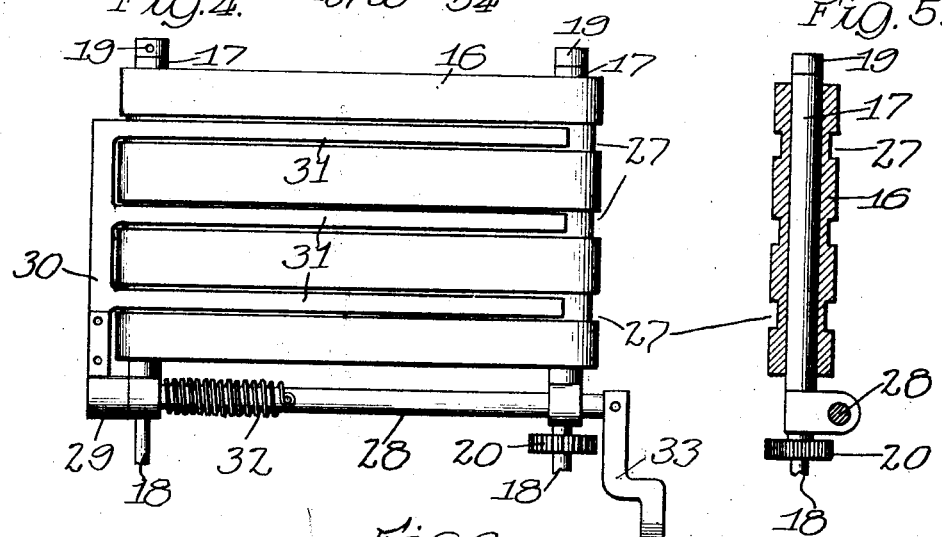
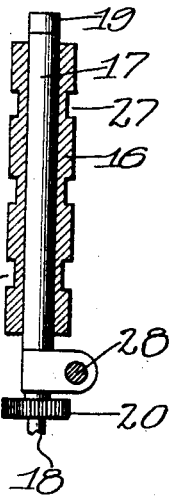
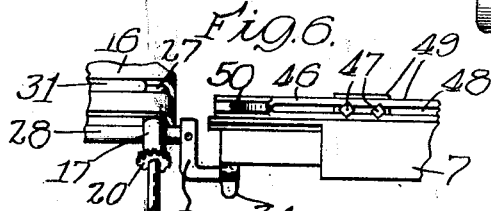
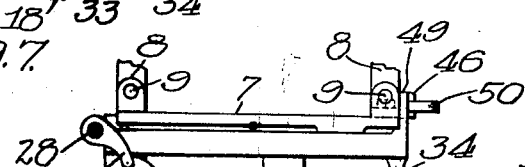
Witnesses:
G. W. Omarus Jr.
R. Burkhardt
Inventor
Edward M. Stiles
By Brown & Hopkins
Attys.

UNITED STATES PATENT OFFICE.

EDWARD M. STILES, OF MOUNT PLEASANT, IOWA.

MEAT-STACKER.

1,043,878.  Specification of Letters Patent.  Patented Nov. 12, 1912.

Application filed February 19, 1912. Serial No. 678,645.

*To all whom it may concern:*

Be it known that I, EDWARD M. STILES, a citizen of the United States, residing at Mount Pleasant, in the county of Henry and State of Iowa, have invented certain new and useful Improvements in Meat-Stackers, of which the following is a specification.

This invention relates to improvements in meat stackers for piling slices of meat as they are delivered by the meat slicer, and is more particularly adapted, though not necessarily limited in its use, in combination with any of the well known types of meat slicers in which the slices are cut from a block or piece of meat, and this application is a substitute application for my original application Serial Number 632,680, filed in the United States Patent Office, June 2nd, 1911.

The present invention relates more particularly to a meat stacker of such construction that the slices of meat are superposed or piled one on top of the other broad side down, so that they will all lie in a substantially horizontal plane instead of piling them on edge. The ordinary meat slicer cuts the slices from the side of a piece or block of meat, so that if they are moved straight out from the slicer they will be standing on edge. It is found that certain classes of meat cannot easily be stacked in this manner, the individual slices falling over instead of adhering together sufficiently to stand on edge as a unit. It is, therefore, very desirable to be able to construct a meat stacker which will superpose or pile up the meat in accordance with the principles of the present invention, thereby saving the butcher a considerable amount of extra work and time, which he would otherwise occupy in arranging the slices into a pile after the slices had been cut, outside of sanitary reasons.

The main objects of the invention are to provide a meat stacker which will take the individual slices as they are cut and superpose or pile them, broad side downward, in a vertical pile; particularly to provide a meat stacker of the aforementioned type which can be easily attached to any of the well known forms of meat cutters; to provide a meat stacker of such construction that when thus associated with a meat cutter its movements and actions will be entirely automatic, its several parts deriving motion from the movement of elements contained in the meat cutter; to provide means for carrying the individual slices of meat away from the cutting knife of the cutter as fast as the meat is severed from the piece, so that each individual slice will be kept straight and smooth no matter how thin it may be; to provide a support or platform on which to stack the meat, and which support is movable upwardly and downwardly, so that as the height of the meat pile continually increases the support will be lowered a sufficient distance to keep the upper surface of the pile at substantially the same elevation; to provide, nevertheless, a form of table the elevation of which can be quickly adjusted before commencing the meat stacking operation; and in other ways and manners to provide a meat stacker to meet all of the foregoing as well as other requirements.

Figure 2:
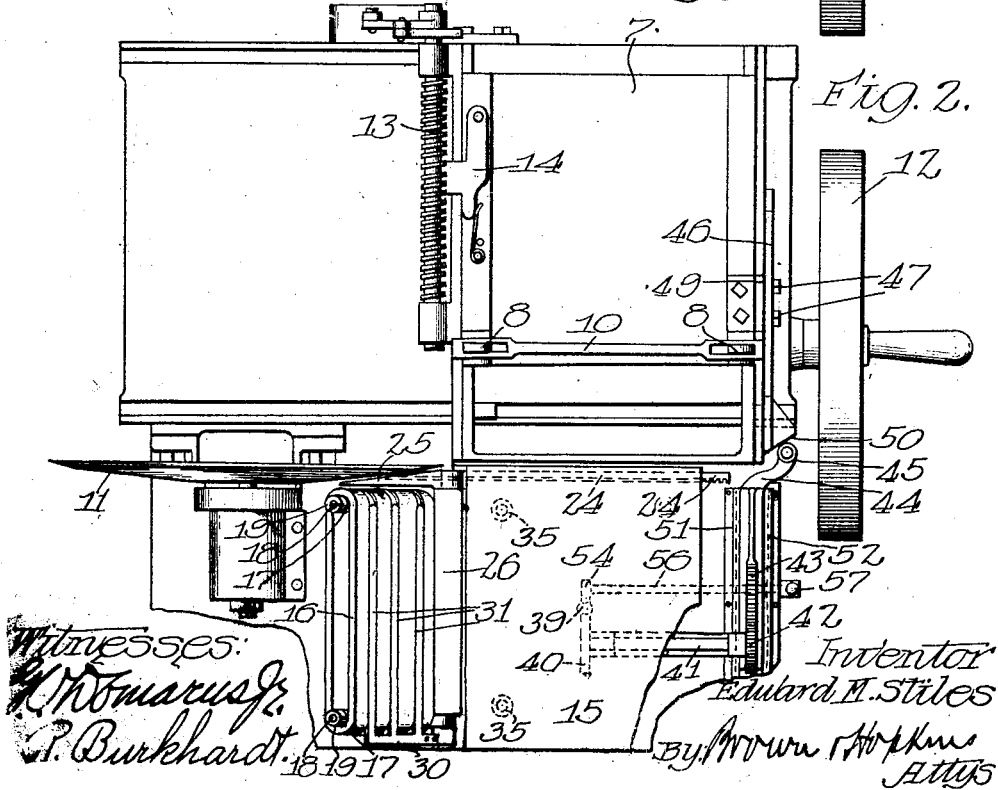

Referring now more particularly to the drawings, and in the present exemplification of the invention, Figure 1 shows a side elevation of an improved machine of this character constructed in accordance with the principles of this invention, and showing the same as applied to a well known type of meat cutter. Fig. 2 is a top plan view of the parts shown in Fig. 1 with the carrier illustrated in its initial position. Fig. 3 is an end elevation of the vertical movable support and a portion of the carrier to illustrate the manner in which the elevation of the support is determined by the position of the carriage. Fig. 4 is an enlarged detail side elevation of the receiver for receiving the slices as they are cut, and the fingers for transferring the slices of meat from the receiver to the support. Fig. 5 is a cross section through the receiver of Fig. 4. Figs. 6 and 7 are elevations of details.

The ordinary type of meat cutter is provided with a sidewise movable carriage on which the block of meat is secured and which carriage may be advanced back and forth or relatively with respect to a suitable knife or cutter, so as to bring the face of the block of meat consecutively into contact with the cutter and thus sever the slices of meat from the block. Suitable mechanism is provided for advancing the carriage and its block of meat the desired amount toward the knife during each stroke so as to always sever the slices of meat from the block, which slice will be of the proper thickness. Suitable mechanism is provided for advancing the carriage back and forth, for advancing the carriage toward the knife blade, and for rotating the knife blade, if that should be desired.

In the present embodiment of this invention, there is provided a support or platform adjacent the meat cutter, adapted to receive the slices of meat as they are severed. A carrier of suitable construction is also provided for receiving each individual slice of meat as it is severed, to carry the same away from the knife blade, and means are also provided for transferring each slice from the carrier or receiver to the support or platform after the slice has been completely severed. In order to compensate for the continually increasing height of the pile of meat formed by the slices superposed upon the support, the support is mounted in such a way that it is vertically movable and means are provided for lowering the support preferably automatically, after each slice of meat has been piled on to it, a distance equal to the thickness of the slice last secured. In this way the elevation of the top of the meat pile is always maintained at substantially the same point.

Referring now to the drawings, the platform of the meat holder is designated by the reference numeral 7. It is provided with the usual uprights 8, preferably pivoted to the platform at the points 9, and is provided with a cross bar 10, which latter may be pulled down against the top of the block of meat to clasp the same firmly against the carriage. Means are provided for moving the carriage backwardly and forwardly behind the cutting disk or knife 11, which latter preferably rotates during the cutting stroke so as to better sever a slice of meat from the piece. In the particular construction illustrated a hand wheel 12 serves as the source of power for imparting a relative movement to the carriage and disk. However, such constructions are well known in the art, and need not be further described in this specification. Each time the carriage is returned to its normal position, as shown in Figs. 1 and 2, it is advanced forwardly a predetermined distance, so that the piece of meat will protrude out into the line of the cutting disk, and thus insure the severing of a given thickness of meat in the next stroke. In the particular construction illustrated, this advancing mechanism embodies a screw 13, which engages a grooved finger 14, and which screw is rotated by any suitable mechanism a slight amount as the carriage is restored to its initial position.

All of the above described mechanisms are well known, and they are only illustrated and described in this application for the purpose of showing the relation which this improved meat stacker bears to a well known form of meat cutter.

The meat stacker comprises a vertically movable support or platform 15, placed adjacent to the meat cutter, and a carrier or receiver which in the present exemplification of the invention is shown as a belt carrier for carrying the individual slices of meat away from the cutting disk. The carrier is preferably mounted on a pair of rollers 17, mounted on shafts 18 (see particularly Fig. 4), and held in position on said shafts by means of collars 19. These shafts and rollers are substantially parallel to each other and are preferably tilted back at an angle from the vertical, as is well shown in Fig. 1. The roller which is adjacent to the carriage is provided with a pinion 20, which latter meshes with a beveled gear 21 carried on a vertical shaft 22. The gear 23 on said vertical shaft meshes with a rack 24, which is mounted in any suitable manner on the carriage, so that as the carriage moves back and forth the beveled gear, gear and pinion will be rotated to move the belt back and forth at a speed equal to the speed of the travel of the carriage.

Inasmuch as the ordinary type of cutting disk is beveled as illustrated in Fig. 2, there will be a space between the cutting disk and the roller or the edge of the receiver or carrier which is adjacent the disk. In order to cover this space and thus insure a perfect transfer of the meat slice to the receiver or carrier, there is provided a guard 25, preferably in the form of a finger of triangular configuration, which extends from a point close to the belt to a point close to the disk. This guard is supported in any suitable manner, but preferably is a part of the bar 26 which gaps the space between the lower edge of the receiver and the platform.

The mechanism thus far described is sufficient for the purpose of receiving each individual slice of meat as it is cut and for carrying it away from the cutting disk. The slices may be transferred from this receiver or carrier and superposed upon the support 15, with broad side down upon the support in any suitable manner. A simple and efficient means for accomplishing this result will now be described.

Referring now more particularly to Figs. 4 and 5, it will be noted that in the present form of the invention the belt 16 is provided with a number of longitudinal grooves 27. A shaft 28 extends substantially parallel to the lower edge of the belt, and is provided with a sleeve 29 at its outer end. To the other end is secured a bar 30, which in turn carries any number of fingers 31, which are adapted to lie flat in the corresponding grooves 27 when the shaft 28 is oscillated into proper position. An elastic member 32, preferably in the form of a spiral spring, surrounds the shaft 28 and is connected thereto and to a stationary member, so that it will exert a continual force, tending to restore the fingers to the position shown in Fig. 4. At its inner end, the shaft carries a finger 33 which protrudes into the path of movement of a lug 34, mounted beneath and carried by the transversely movable carriage. (As shown more clearly in Figs. 6 and 7.) As the carriage completes each cutting stroke, the lug 34 will strike the finger 33, and thus rotate the shaft 28 to throw the fingers away from the carrying belt and transfer and deposit the slice of meat broadside down on to the support 15. As soon as the carriage starts its return movement the fingers will be restored to their normal position by the elastic member 32, and will thus allow the belt to present a smooth surface for the reception of the next slice of meat.

It is obvious that unless means are provided for lowering the support 15, a suitable distance after each slice of meat has been laid on it, eventually the pile of meat will become so high that the movement of the fingers 31 will be obstructed, and the meat will not be properly piled. To overcome this difficulty, there is provided a support of such construction that it may be lowered in a vertical direction. Any suitable mechanism may be provided for this purpose, but a simple and efficient means for accomplishing the result will now be described.

Referring particularly to Figs. 2 and 3, the support is carried by a number of rods 35, which pass through suitable holes in the base 36. Nuts 37 on these rods limit the upward movement of the support, which upward movement is occasioned by means of springs 38, surrounding the rods. These rods are of such a length and the nuts 37 are so located thereon that the support 15 when it is in a position at the extreme upper movement thereof, will be spaced below the bar or supporting surface of the meat table or holder 7, so that the first slice will be deposited upon the platform before the platform begins its intermittent lowering movement. It is obvious that it would be possible to so proportion the springs that the support 15 would automatically or naturally fall a distance equal to the thickness of the meat slices each time the slice is deposited or laid on the platform. However, in order to insure a positive downward movement of the support a proper distance each time a slice of meat is deposited, there is provided means whereby the downward movement of the support is occasioned by the advance of the carriage itself, and the extent of each downward movement is also controlled by this movement of the carriage so that each step of downward movement of the support will be equal to the thickness of the slice. To this end there is provided in the present form of the invention a vertical rack bar 39 on the support, and a gear 40 on a shaft 41 meshing with the rack. Another gear 42 (see particularly Fig. 1) meshes with a rack 43 to which is attached an arm 44, provided at its upper end with a contacting roller 45. A member 46 (see particularly Figs. 2, 6 and 7) is provided which is adjustably connected by means of suitable fastening devices 47, passing through a slot 48 in the member and into a portion 49 of the table 7, and this member 46 is provided with a cam face 50, adapted to contact with the roller 45 at the end of each carriage stroke, and thus to force the roller and the arm 44 forwardly a slight amount, corresponding to the forward feed of the carriage during that stroke. Guides 51—52 (see particularly Fig. 1) are provided which insure a perfect back and forward travel of the rack 43. Ratchet teeth 53 (see Fig. 3) are provided on the rack bar 39 and a pawl 54 and spring 55 are provided for holding the rack bar down in the position last determined by the cam face 50. Each time the carriage returns to its initial position it will throw the rack bar 43 forwardly a short distance, thus rotating the shaft 41 and drawing the rack bar 39 and support 15 downwardly against the tension of the springs or elastic member 39 the support 15 being held in such lowered position by means of the pawl and ratchet 54—53. The pawl is preferably mounted on a shaft 56 which carries a finger or handle 57 at its outer end or in any convenient position for the operator, so that when the meat stacking operation is completed the pawl may be released from the rack, thus allowing the support 15 to rise into its uppermost position, as shown in Fig. 3. By providing the member 46 with the cam face 50, and which member is adjustably connected with the carriage 7, it will be manifest that after the carriage 7 has been moved forwardly a short distance, and the rack bar 43 moved forwardly a corresponding distance, the carriage 7 may be moved backwardly in the ordinary and well known manner, by shifting the finger 14 out of engagement with the screw 13. In this position another piece of meat may be placed upon the carriage, or the piece of meat which is on the carriage may be repositioned thereon, and the cutting operation continued without the necessity of returning the support 15 to its uppermost position. That is to say, if the cutting operation has proceeded to such an extent that the support 15 will be lowered to a point intermediate its uppermost and lowermost positions, it may be retained in this position and the carriage 7 moved backwardly or away from the cutter knife in a direction transversely thereof. It will be manifest that should the carriage 7 be thus adjusted the roller 45 would under ordinary conditions have assumed such a position that it would not be shifted by the cam 50 until the carriage 7 had reached the position from which it had been adjusted or the position with the cam 50 in contact with the roller 45. Therefore it will be seen that after the carriage 7 has been shifted backwardly the member 46 may be shifted with respect to the carriage by loosening the fastening devices 47 and sliding the member 46 forwardly until the cam face 50 contacts with the roller 45. After being fastened in this position the cutting operation may be proceeded with and the support 15 will again be automatically and intermittently held by the feeding movement of the carriage 7.

In order to permit the lug 34 which engages the finger 32 to lock the shaft 28 to be placed under the front edge of the carriage, the support 58 (see particularly Fig. 3) for the rack 24 may be spaced from the front edge of the carriage a distance sufficient to permit the lug 34 to be secured under the front edge of the carriage, and the extremity of the finger 33 to project under such edge.

Obviously many changes may be made in the details of construction and the operation of the various parts without departing from the spirit of the invention.

What I claim as new is:—

1. The combination of a meat support and a slicing knife, said support and knife being capable of relative movement, a receiver for the slices cut from the meat, and means for superposing the slices upon the receiver and on top of each other.

2. The combination of a meat support and a slicing knife, said support and knife being capable of relative movement, a receiver for the slices cut from the meat, and means for placing the slices upon the receiver broadside down and superposing them upon the receiver and on top of each other.

3. The combination of a meat support and a slicing knife, said support and knife being capable of relative movement, a receiver for the slices cut from the meat and means controlled by such relative movement for superposing the slices upon the receiver and on top of each other.

4. The combination of a meat support and slicing knife capable of relative movement, a receiver for the slices and means for delivering each slice to the receiver as it is cut and superposing the slices upon the receiver and on top of each other.

5. The combination of a meat support and slicing knife capable of relative movement, a receiver for the slices and means controlled by such relative movement for delivering each slice to the receiver as it is cut and superposing the slices upon the receiver and on top of each other.

6. The combination of a meat slicer, a support for the slices, a receiver for receiving the slices as they are cut and means for superposing the slices upon the support from the said receiver and on top of each other.

7. The combination of a meat holder and a slicing knife capable of relative movement, a support for the slices, a receiver for receiving the slices directly they are cut, and means controlled by such relative movement for superposing the slices upon the support from the receiver and on top of each other.

8. The combination of a meat slicer, a vertically movable support for the slices adjacent the slicer, and means for superposing the slices upon the support and on top of each other as they are cut.

9. The combination of a meat slicer, a vertically movable support for the slices adjacent the slicer, means for superposing the slices upon the support as they are cut, and means for automatically moving the support vertically.

10. The combination of a meat slicer, a vertically movable support for the slices adjacent the slicer, means for superposing the slices upon the support as they are cut, and means for intermittently moving the support vertically.

11. The combination of a meat slicer, a vertically movable support for the slices adjacent the slicer, means for superposing the slices upon the support as they are cut, means for automatically moving the support vertically, in one direction, and means for returning the support.

12. The combination of a meat slicer, a vertically movable support for the slices adjacent the slicer, means for superposing the slices upon the support as they are cut, and means for automatically moving the support vertically a distance equal to the thickness of each slice and after each slice is cut.

13. The combination of a meat slicer, a vertically movable support for the slices adjacent the slicer, means for superposing the slices upon the support as they are cut, means for intermittently moving the support vertically a distance equal to the thickness of each slice after each slice is cut, and means whereby the thickness of the slices and the vertical movement of the support may be varied at will.

14. The combination of a meat holder and slicing knife capable of relative movement, a support for the slices and movable downwardly, means for superposing the slices upon the support as they are cut, means controlled by the said relative movement for intermittently lowering the support, and means for returning the support.

15. The combination of a meat holder and slicing knife capable of relative movement, a support for the slices and movable downwardly, means for superposing the slices upon the support as they are cut, means controlled by the said relative movement for intermittently lowering the support a distance equal to the thickness of the slice, and means for returning the support.

16. The combination of a meat slicer, of a vertically movable support adjacent the slicer, and means for transferring the slices of meat from the slicer, and delivering them broad side down upon the support and on top of each other.

17. The combination of a meat holder and slicer capable of relative movement, a support for the slices, and means controlled by the said relative movement for transferring the slices of meat as they are cut, broad side down upon the support and on top of each other.

18. The combination of a meat holder and slicer capable of relative movement, a support for the slices movable upwardly and downwardly, means for transferring the slices of meat as they are cut, broad side down upon the support and on top of each other, and means whereby such relative movement will intermittently move the support in one of its directions of movement.

19. The combination of a meat holder and slicer capable of relative movement, a support for the slices movable upwardly and downwardly, means controlled by such relative movement of the holder and slicer for transferring the slices of meat as they are cut, broad side down upon the support and on top of each other, and means whereby such relative movement will intermittently move the support in one of its directions of movement.

20. The combination of a meat holder and slicer capable of relative movement, a support for the slices movable upwardly and downwardly, means controlled by such relative movement of the meat holder and slicer for transferring the slices of meat as they are cut, broad side down upon the support, and means whereby such relative movement will intermittently move the support in one of its directions of movement a distance equal to the thickness of each slice cut.

21. The combination of a meat slicer, a receiver for receiving each of the slices as they are cut from the meat, a support, and means for transferring the slices from the receiver broad side down on the support and on top of each other.

22. The combination of a meat holder and slicer capable of relative movement, a receiver for receiving the slices as they are cut, a support, and means controlled by such relative movement for transferring the slices from the receiver on to the support and on top of each other.

23. The combination of a meat holder and slicer capable of relative movement, a receiver for receiving the slices as they are cut, a support, and means controlled by such relative movement for transferring the slices from the receiver, face down on to the support and on top of each other.

24. The combination of a meat holder and slicer capable of relative movement, a receiver for receiving the slices as they are cut, a support, and means controlled by such relative movement for transferring the slices from the receiver and superposing them upon the support and on top of each other.

25. The combination with a meat slicer provided with a rotary disk cutter, of a carrier for receiving each slice from the cutter as the slice is severed from a block of meat, a support, and means for placing the slices of meat broad side down on to the support and from the carrier and on top of each other.

26. The combination of a meat slicer having a transversely movable carriage and cutting knife, a carrier for receiving a slice of meat from the slicer as it is severed from a piece of meat by the knife, a driving connection between the carriage and carrier, a vertically movable support adjacent the carrier, and means for transferring the slices of meat from the carrier broad side down on to the support.

27. The combination with a meat slicer, having a transversely movable carriage and a cutting knife, of a carrier for receiving a slice of meat from the slicer, as it is severed from the piece of meat by the knife, means for driving the carrier, a support adjacent to the carrier, and means for dumping the slices of meat from the carrier to the support and on top of each other.

28. The combination with a meat slicer having a transversely movable carrier and a cutting knife, of a belt carrier for receiving a slice of meat as the same is severed from a piece of meat by the knife, driving connection between the meat slicer and the belt carrier, whereby the carrier is driven in accordance with the movements of the carriage, a support adjacent to the belt carrier, and means for transferring a slice of meat from the belt carrier to the support.

29. The combination of a meat slicer having a transversely movable carriage and a cutting knife, of a carrier for receiving a slice of meat as the same is severed from a piece of meat by the knife, a suitable driving connection between the meat slicer and the carrier whereby the carrier is driven in accordance with the movement of the carriage, a support adjacent to the carrier, and means for transferring a slice of meat from the carrier to the support and for piling the slices on top of each other.

30. The combination with a meat slicer having a movable carriage and a cutting knife, of a carrier for receiving a slice of meat as the same is severed from a piece of meat by the knife, means for driving the carrier in a manner whereby it moves with the movements of the carriage, a support adjacent to the carrier, and means for transferring the slice of meat from the carrier to the support and for piling the slices on top of each other.

31. The combination with a meat slicer having a transverse and forwardly movable carriage and a knife, of a belt carrier adjacent to the knife and adapted to receive a slice of meat as the same is severed from a piece of meat, a vertically movable support adjacent to the carrier, means for transferring a slice of meat from the carrier to the support, and a driving connection from the forwardly moving carriage to the support, whereby the support is lowered a distance equal to the forward advance of the carriage each time a cutting stroke is performed.

32. The combination with a meat slicer having a transversely and forwardly movable carriage and a knife, of a carrier adjacent to the knife and adapted to receive a slice of meat as the same is severed from a piece of meat, a vertically movable support adjacent to the carrier, means for transferring a slice of meat from the carrier to the support, and a driving connection from the forwardly movable carriage to the support, whereby the support is lowered each time a cutting stroke is performed.

33. The combination with a meat slicer having a transversely and forwardly movable carriage and a cutting knife, of a belt carrier for receiving a slice of meat from the knife as the slice is severed from a piece of meat, a vertically movable support adjacent to the carrier, means for transferring a slice of meat from the belt carrier, face down on to the support, an actuating connection from the transversely movable carriage to the transferring means, and adapted to actuate the same at the end of a cutting stroke, a driving connection from the transversely movable carriage to the belt carrier, whereby a slice of meat is carried away from the knife as rapidly as it is severed from the piece of meat, and a driving connection from the carriage to the support, whereby the support is lowered at the performance of each cutting stroke a distance substantially equal to the thickness of the slice of meat last cut.

34. The combination of a meat slicer having a forwardly movable carriage and a cutting knife, of a carrier for receiving a slice of meat from the knife as the slice is severed from a piece of meat, a vertically movable support adjacent to the carrier, means for transferring a slice of meat from the carrier face down on to the support, an actuating connection from the transversely movable carriage to the transferring means and adapted to actuate the same at the end of a cutting stroke, a driving connection from the transversely movable carriage to the carrier, whereby a slice of meat is carried away from the knife as it is severed from the piece of meat, and a driving connection from the carriage to the support whereby the support is lowered at the performance of each cutting stroke.

35. The combination with a meat slicer having a forwardly movable carriage and a cutting knife, of a vertically movable support adjacent to the carriage, means for receiving the slices, means for transferring a slice of meat from the knife, face down, on to the support, means for lowering the support at the end of each cutting stroke a distance substantially equal to the thickness of the slice of meat last cut, and means for retaining the support in such lowered position.

36. The combination with a meat slicer having a forwardly movable carriage and a cutting knife, of a vertically movable support adjacent to the carriage, means for transferring a slice of meat from the knife broad side down on to the support, and means for lowering the support at the end of each cutting stroke.

37. The combination with a meat slicer having a forwardly movable carriage and a cutting knife, of a vertically movable support adjacent to the carriage, means for transferring a slice of meat from the knife broad side down on to the support, and means for lowering the support at the end of each cutting stroke a distance substantially equal to the thickness of the slice of meat last cut.

38. The combination of a meat slicer having a carriage and a cutting knife relatively movable, a receiver adjacent the knife for receiving the slices as they are cut, a movable arm, one or more fingers on the arm adapted to assume a position below or substantially flush with the receiver, a support, and means for throwing the arms at the end of each cutting stroke to actuate the fingers to transfer a slice of meat from the receiver to the support and for piling slices on top of each other.

39. The combination of a meat slicer having a carriage and a cutting knife relatively movable, a receiver adjacent the knife for receiving the slices as they are cut, a movable arm, one or more fingers on the arm adapted to assume a position below or substantially flush with the receiver, a support, and means controlled by such relative movement of the carriage and slicer for throwing the arm at the end of each cutting stroke to actuate the fingers to transfer a slice of meat from the receiver to the support and to pile the slices on top of each other.

40. The combination of a meat slicer having a carriage and a cutting knife relatively movable, a conveyer adjacent the knife for receiving and conveying away the slices from the knife as they are cut, means whereby such relative movement will impart movement to the conveyer, one or more fingers coöperating with the conveyer and adapted to assume a position to remove the meat from the conveyer, a support, and means for throwing the finger or fingers at the end of each cutting stroke to transfer a slice of meat from the conveyer to the support.

41. The combination of a meat slicer having a carriage and a cutting knife relatively movable, a conveyer adjacent the knife for receiving and conveying away the slices from the knife as they are cut, means whereby such relative movement will impart movement to the conveyer, one of more fingers coöperating with the conveyer and adapted to assume a position to remove the meat from the conveyer, a support, and means whereby the said relative movement will actuate the finger or fingers to transfer a slice of meat from the conveyer broad side down upon the support.

42. In a meat stacker, the combination of a vertically movable platform and grooved belt adjacent the same, an arm pivoted adjacent the belt, a plurality of fingers on the arm, adapted to seat in the grooves of the belt, and means for actuating the arm on its pivot to raise the fingers out of the grooves and transfer a slice of meat broad side down on to the platform.

43. In a meat stacker, the combination of a platform, a longitudinally movable grooved belt adjacent the edge of the platform, an arm pivoted adjacent the lower end of the belt, a plurality of fingers on the arm adapted to seat into the grooves of the belt, and means for actuating the arm on its pivot to raise the fingers out of the grooves and transfer a slice of meat from the belt broad side down on to the support.

44. In a meat stacker, the combination of a platform, a pair of rollers mounted adjacent one edge of the platform and extending out at an angle of the same, a grooved belt passing over the rollers, an arm pivoted adjacent the belt, a plurality of fingers on the arm adapted to seat into the grooves of the belt, and means for actuating the arm of its pivot to raise the fingers out of the grooves and transfer a slice of meat broad side down on to the platform.

45. In a meat stacker, the combination of a platform, a pair of rollers mounted adjacent the platform and extending away from the same at an angle, a grooved belt passing over the rollers, a shaft mounted on the lower edge of the belt, an arm secured to said shaft, a plurality of fingers on the arm adapted to seat within the grooves of the belt, an actuating finger on the shaft, a spring normally rotating the shaft to seat the fingers of the arm within the grooves of the belt, and means for throwing the actuating finger to rotate the shaft to raise the fingers out of the grooves of the belt and transfer a slice of meat broad side down on to the platform.

46. In a meat stacker, the combination of a vertically movable platform, springs normally tending to raise the same, a rack attached to the platform, a pinion meshing with the rack, and means for rotating the pinion to lower the platform the thickness of a slice of meat each time a slice of meat is deposited on the platform.

47. In a meat stacker, the combination of a vertically movable platform, springs normally tending to raise the same, a rack attached to the platform, a pinion meshing with the rack, means for rotating the pinion to lower the platform the thickness of a slice of meat each time a slice is deposited on the platform, a fine-toothed rack attached to the platform, and a dog engaging said fine-toothed rack to maintain the platform in lowered position.

48. In a meat stacker, the combination of a platform, a pair of rollers mounted adjacent two of the corners of the same, a grooved belt passing over the rollers, an arm, a pivotal mounting for the same adjacent the lower edge of the belt, a plurality of fingers on the arm adapted to seat within the grooves of the belt, means for rotating a roller to move the belt a distance equal to the length of a slice of meat, and means for subsequently actuating the arm to raise the fingers out of the groove of the belt and transfer a slice of meat broad side down on to the platform.

49. In a meat stacker, the combination of a platform, a longitudinally movable meat carrier adjacent to the same and placed at an oblique angle to the same, and means for transferring a slice of meat from the carrier broad side down on to the platform and for piling the slices on top of each other.

50. In a meat stacker, the combination of a horizontal platform, a pair of rollers extending away from the same at an angle, a belt passed over the rollers, means for transferring a slice of meat from the belt broad side down on to the platform, and means for rotating one of the rollers to cause the belt to travel a distance substantially equal to the length of a slice of meat.

51. In a meat stacker, the combination of a platform, a pair of rollers extending outward away from the platform, a grooved belt passing over the rollers and extending in a direction parallel to the adjacent end of the platform, means for causing the belt to travel a distance substantially equal to the length of a slice of meat, fingers lying within the grooves of the belt, and means for actuating said fingers to transfer a slice of meat from the belt broad side down on to the platform.

52. In a meat stacker, the combination of a vertically movable platform, a pair of rollers outwardly extending away from the same, a belt passed over the rollers and extending in a direction substantially parallel to the adjacent edge of the platform, means for causing the belt to travel a distance substantially equal to the length of a slice of meat, means for transferring a slice of meat from the belt broad side down on to the platform, and means for lowering the platform a distance equal to the thickness of the slice of meat.

53. The combination of a meat slicer, a support for the slices adjacent the slicer and means for depositing the slices broadside down upon the support as they are cut and piling them on top of each other.

54. The combination of a meat slicer, a receiver for receiving the slices as they are cut, a support and means for dumping the slices from the receiver to the support and piling them on top of each other.

55. The combination of a meat slicer, a receiver for receiving the slices as they are cut, a support and means for dumping the slices from the receiver to the support, broad side down and piling them on top of each other.

56. The combination of a meat slicer, a receiver for receiving the slices as they are cut, a support, and means for swinging the receiver for dumping the slices from the receiver and piling them on top of each other on the support.

57. The combination of a relatively movable meat holder and cutter, a receiver for receiving the slices as they are cut, a support, and means controlled by such relative movement for dumping the slices from the receiver and piling them on top of each other broad side down upon the support.

58. The combination of a relatively movable meat holder and cutter, a receiver for receiving the slices as they are cut, a support and means controlled by such relative movement for lifting the slices from the receiver and piling them on top of each other broad side down upon the support.

59. The combination of a relatively movable meat holder and cutter, a receiver for receiving the slices as they are cut, a portion of the receiver being disposed in close proximity to one face of the cutter, means extending between the cutter and holder and spanning the space therebetween for guiding the slices over the space, and means for depositing the slices from the receiver and broad side down and on top of each other upon the support.

60. The combination of a relatively removable meat holder and cutter, a receiver for receiving the slices as they are cut, a portion of the receiver being disposed in close proximity to one face of the cutter, means extending between the cutter and receiver and spanning the space therebetween for guiding the slices over the space, and means controlled by such relative movement for piling the slices on top of each other and upon the support and as the slices are cut.

61. The combination of a meat slicer, a carrier for receiving a slice of meat from the slicer as it is severed by the knife from the piece of meat, a vertically movable support adjacent the carrier, and means for superposing the slices broad side down upon the support and from the carrier.

62. The combination of a meat slicer, a carrier for receiving a slice of meat from the slicer as it is severed by the knife from the piece of meat, a vertically movable support adjacent the carrier, means for superposing the slices broad side down upon the support and from the carrier, and means for automatically moving the support vertically.

In testimony whereof I have signed my name to this specification, in the presence of two subscribing witnesses, on this 14 day of February A. D. 1912.

EDWARD M. STILES.

Witnesses:
  MARY I. STILES,
  THOMAS H. STILES.